United States Patent
Shao et al.

(10) Patent No.: US 12,439,233 B2
(45) Date of Patent: Oct. 7, 2025

(54) METHODS AND INTERNET OF THINGS (IoT) SYSTEMS FOR DETERMINING FIRE RESCUE PLAN IN SMART CITY

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Yongzeng Liang, Chengdu (CN); Xiaojun Wei, Chengdu (CN); Zhihui Wen, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 471 days.

(21) Appl. No.: 18/050,042

(22) Filed: Oct. 26, 2022

(65) Prior Publication Data
US 2023/0081554 A1    Mar. 16, 2023

(30) Foreign Application Priority Data
Oct. 20, 2022   (CN) .......................... 202211284997.9

(51) Int. Cl.
*H04W 4/90*       (2018.01)
*G06Q 10/0631*    (2023.01)
(Continued)

(52) U.S. Cl.
CPC ........ *H04W 4/90* (2018.02); *G06Q 10/06313* (2013.01); *G16Y 10/75* (2020.01); *G16Y 40/50* (2020.01)

(58) Field of Classification Search
CPC .......... H04W 4/90; G16Y 10/75; G16Y 40/50
See application file for complete search history.

(56) References Cited

U.S. PATENT DOCUMENTS

| 11,790,766 B2 * | 10/2023 | Martin | ................... | G08B 21/10 |
| | | | | 701/31.4 |
| 2017/0238129 A1 * | 8/2017 | Maier | ..................... | H04W 4/14 |
| | | | | 455/404.2 |

(Continued)

FOREIGN PATENT DOCUMENTS

| CN | 114067627 A | * | 2/2022 | .............. G06F 3/011 |
| CN | 119741439 A | * | 4/2025 | |

(Continued)

OTHER PUBLICATIONS

Mritunjay, Shall Peelam, A Review on Emergency Vehicle Management for Intelligent Transport Systems, Nov. 2024, IEEE Transactions on Intelligent Transportation Systems, vol. 25, No. 11, pp. 15229-15246 (Year: 2024).*

*Primary Examiner* — Dylan C White
(74) *Attorney, Agent, or Firm* — METIS IP LLC

(57) ABSTRACT

The present disclosure provides methods and Internet of Things (IoT) systems for determining a fire rescue plan in a smart city. The method includes obtaining monitoring data of a disaster area in a first period of time; predicting fire information in a second period of time based on the monitoring data; determining flow information of the disaster area based on the monitoring data, the flow information including at least one of traffic flow information or human flow information; and determining a rescue plan based on the fire information and the flow information, the rescue plan including at least one of a count of fire trucks or a count of ambulances.

9 Claims, 6 Drawing Sheets

(51) Int. Cl.
  *G16Y 10/75* (2020.01)
  *G16Y 40/50* (2020.01)

(56) References Cited

U.S. PATENT DOCUMENTS

| | | | |
|---|---|---|---|
| 2018/0053401 A1* | 2/2018 | Martin | H04M 11/04 |
| 2019/0020993 A1* | 1/2019 | Nguyen | H04L 51/046 |
| 2021/0233388 A1* | 7/2021 | Martin | H04M 1/72421 |
| 2021/0303963 A1* | 9/2021 | Song | G06Q 10/047 |

FOREIGN PATENT DOCUMENTS

| | | | | |
|---|---|---|---|---|
| JP | 2018032423 A | * | 3/2018 | |
| KR | 20210012326 A | * | 2/2021 | ........... G08B 29/145 |
| KR | 20210080145 A | * | 6/2021 | ............. G08B 17/06 |
| WO | WO-2022065164 A1 | * | 3/2022 | |

* cited by examiner

METHODS AND INTERNET OF THINGS (IoT) SYSTEMS FOR DETERMINING FIRE RESCUE PLAN IN SMART CITY

CROSS-REFERENCE TO RELATED APPLICATION

This application claims priority of Chinese Patent Application No. 202211284997.9, filed on Oct. 20, 2022, the contents of which are entirely incorporated herein by reference.

TECHNICAL FIELD

The present disclosure relates to the field of Internet of Things (IoT) technology, and in particular, to methods and IoT systems for determining a fire rescue plan in a smart city.

BACKGROUND

In recent years, fire has become a frequent disaster that endangers people's life and property safety. At present, many cities have integrated a fire protection system and obtained an integrated platform of the fire protection system, so as to facilitate a fire department to check a hidden danger of the fire protection and judge fire information. However, because the current fire protection system still has fire rescue requirements, it is hoped that the system may automatically generate a fire rescue plan based on information such as fire scene data and historical fire rescue data. At the same time, it is hoped that integration of the IoT may be achieved, so that different units or departments may cooperate to carry out fire rescue quickly and reasonably, and reduce loss of people's lives and properties.

Therefore, it is desirable to provide methods and IoT systems for determining a fire rescue plan in a smart city.

SUMMARY

One or more embodiments of the present disclosure provide a method for determining a fire rescue plan in a smart city applied to an IoT system for determining a fire rescue plan in a smart city. The method may include: obtaining monitoring data of a disaster area in a first period of time; predicting fire information in a second period of time based on the monitoring data; determining flow information of the disaster area based on the monitoring data, the flow information including at least one of traffic flow information or human flow information; and determining a rescue plan based on the fire information and the flow information, the rescue plan including at least one of a count of fire trucks or a count of ambulances.

One or more embodiments of the present disclosure provide an IoT system for determining a fire rescue plan in a smart city. The system may include a user platform, a service platform, a management platform, a sensing network platform, and an object platform. The management platform may be configured to: obtain, through the sensing network platform, monitoring data of a disaster area in a first period of time; predict, based on the monitoring data, fire information in a second period of time; determine, based on the monitoring data, flow information of the disaster area, the flow information including at least one of traffic flow information or human flow information; and determine, based on the fire information and the flow information, a rescue plan, the rescue plan including at least one of a count of fire trucks or a count of ambulances.

One or more embodiments of the present disclosure provide a computer-readable storage medium storing computer instructions. When reading the computer instructions in the storage medium, a computer may implement the aforementioned method.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, and wherein.

DETAILED DESCRIPTION

Figure 1:
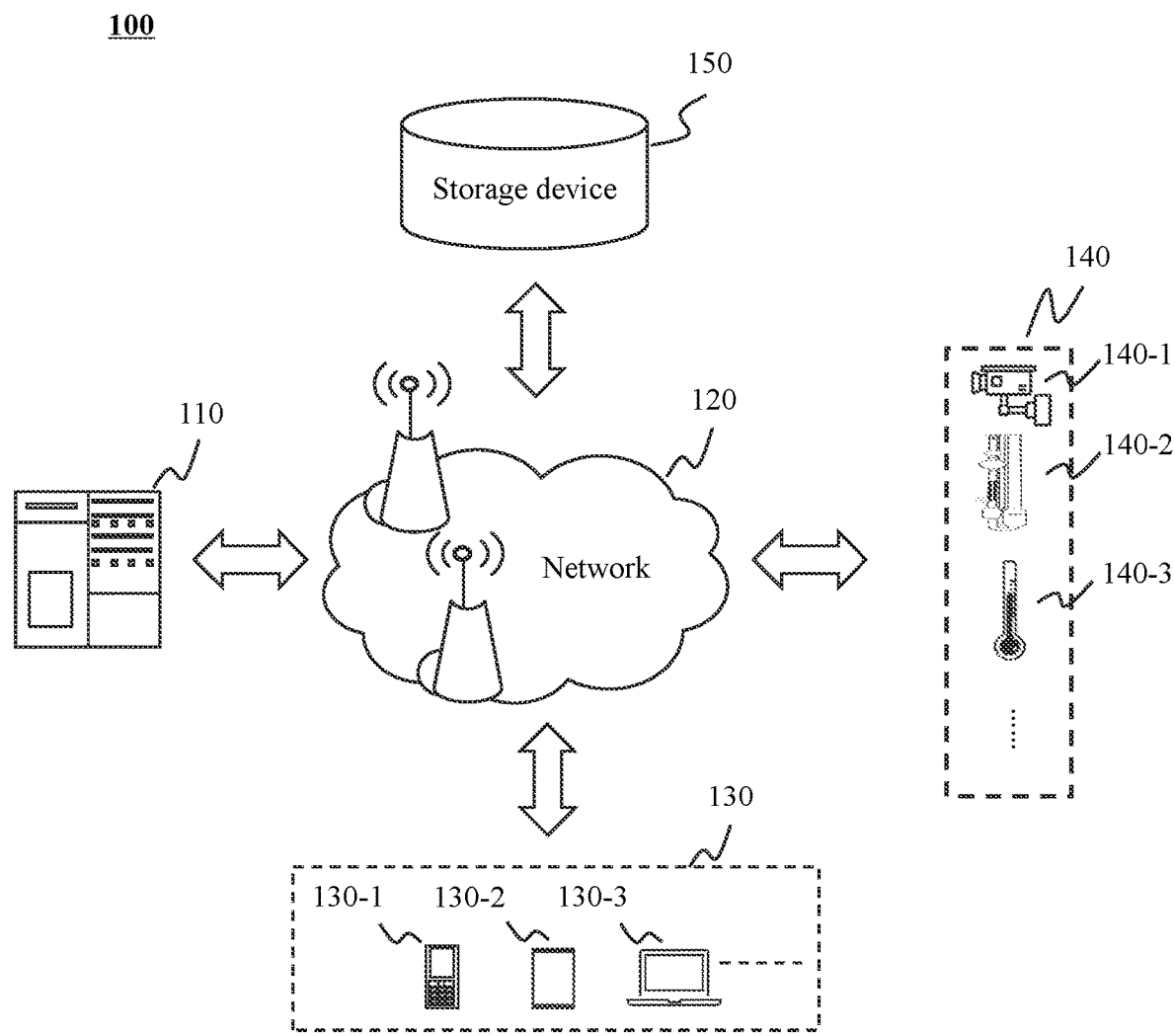
FIG. 1 is a schematic diagram illustrating an exemplary application scenario of an IoT system for determining a fire rescue plan in a smart city according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise, the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

FIG. 1 is a schematic diagram illustrating an exemplary application scenario of a method and IoT system for determining a fire rescue plan in a smart city according to some embodiments of the present disclosure.

As shown in FIG. 1, an application scenario 100 may include a server 110, a network 120, a terminal device 130, a data collection device 140 and a storage device 150.

In some embodiments, the application scenario 100 may determine a fire rescue plan by implementing the method and/or system for determining a fire rescue plan in a smart city disclosed in the present disclosure. For example, in a typical application scenario, when the fire rescue plan needs to be determined, monitoring data of a disaster scene may be obtained through the data collection device 140, and the monitoring data may be sent to the server 110. The server 110 may predict fire information in a second period of time and flow information of the disaster area based on the monitoring data, and determine the rescue plan based on the fire information and the flow information. For more descriptions on the monitoring data, the second period of time, the fire information, the disaster area, and the flow information, please see FIG. 3 and related descriptions.

The server 110 may be connected to the terminal device 130 through the network 120. The server 110 may be connected to the storage device 150 through the network 120. The server 110 may include a processing device. The processing device may be configured to perform the method for determining a fire rescue plan in a smart city disclosed in the present disclosure. The network 120 may connect each component of the application scenario 100 of the fire rescue plan determination system in a smart city according to some embodiments of the present disclosure and/or connect the system and an external resource. The storage device 150 may be configured to store data and/or instructions. For example, the storage device 150 may store the monitoring data and the rescue plan. The storage device 150 may be directly connected to the server 110 or inside the server 110. The terminal device 130 may refer to one or more terminal devices or software. In some embodiments, the terminal device 130 may receive the fire information, the flow information, and the rescue plan sent by the processing device, and display the fire information, the flow information, and the rescue plan to a user. Exemplarily, the terminal device 130 may include other devices with input and/or output functions, such as a mobile device 130-1, a tablet computer 130-2, a laptop computer 130-3, or the like, or any combinations thereof. The data collection device 140 may be configured to collect the monitoring data. For example, a monitoring device 140-1 may obtain a real-time image of the disaster area. A humidity sensor 140-2 may obtain an air humidity of the disaster area. A temperature sensor 140-3 may obtain a real-time temperature of the disaster area, etc.

It should be noted that the application scenario 100 based on the fire rescue plan determination system in a smart city is only provided for the purpose of explanation, and not intended to limit the scope of the present disclosure. For those skilled in the art, various modifications or changes may be made based on the description of the present disclosure. For example, the application scenario 100 may further include a database. As another example, the application scenario 100 may be implemented on other devices to achieve similar or different functions. However, these changes and modifications do not depart from the scope of the present disclosure.

The IoT may be an information processing system that includes a part or all of a user platform, a service platform, a management platform, a sensing network platform, and an object platform. The user platform may be a leader of the entire IoT operation system, which may be used to obtain a user's needs. The user's needs may be a foundation and premise of formation of the IoT operation system. Connections between the platforms of the IoT is to meet the user's needs.

Figure 2:
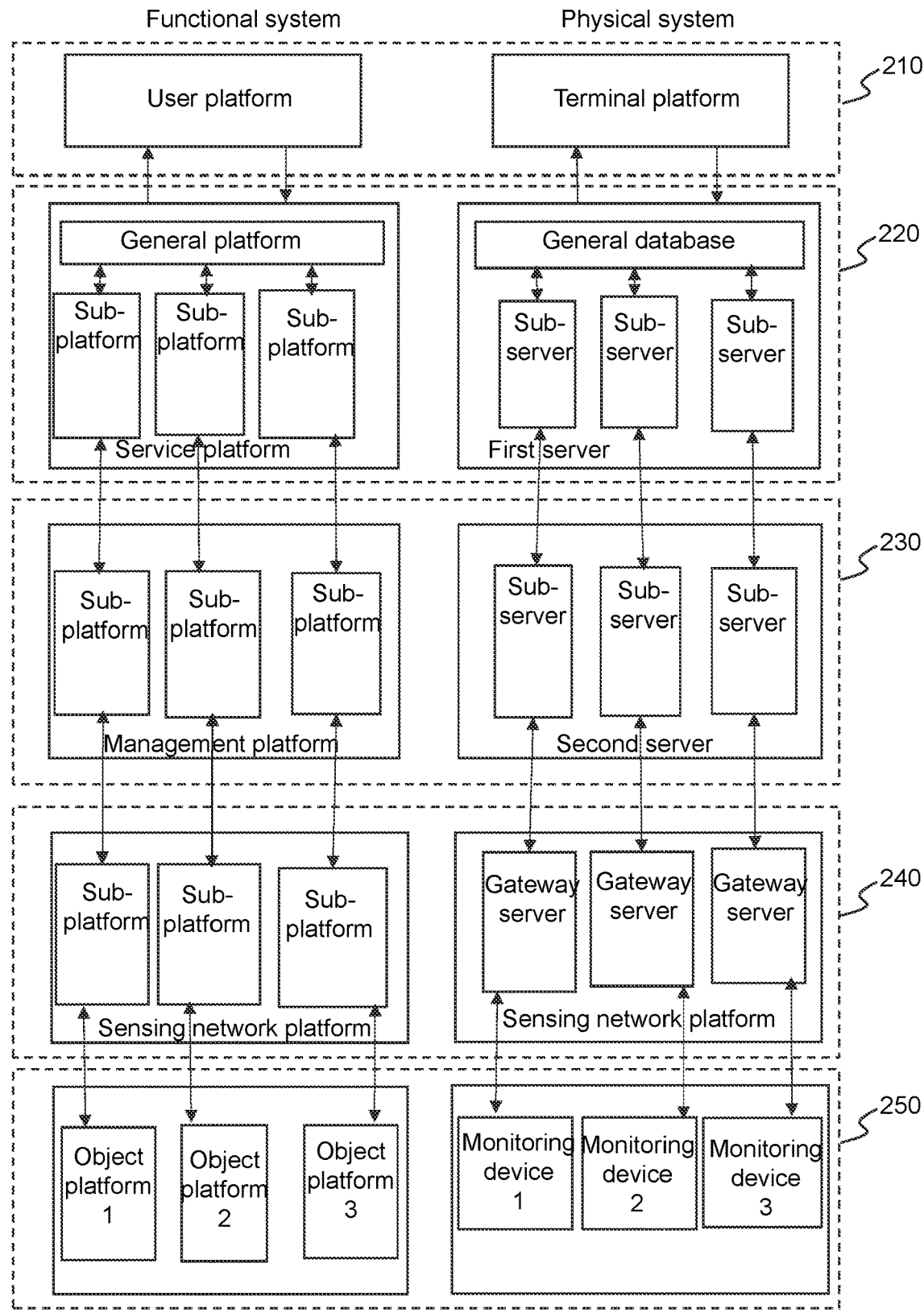
FIG. 2 is a schematic diagram illustrating a platform structure of the IoT system for determining a fire rescue plan in a smart city according to some embodiments of the present disclosure.

FIG. 2 is a schematic diagram illustrating a platform structure of an IoT system for determining a fire rescue plan in a smart city according to some embodiments of the present disclosure.

As shown in FIG. 2, the system 200 for determining a fire rescue plan IoT in a smart city may include a user platform 210, a service platform 220, a management platform 230, a sensing network platform 240, and an object platform 250. In some embodiments, the system 200 for determining a fire rescue plan in a smart city may be implemented by a server or a part of the server.

In some embodiments, the system 200 for determining a fire rescue plan in a smart city may be applied to a plurality of scenarios of fire rescue in a smart city. In some embodiments, the system 200 for determining a fire rescue plan in a smart city may obtain a query instruction based on a query requirement on fire-related information sent by a user, and obtain a query result according to the query instruction. In some embodiments, the system 200 for determining a fire rescue plan in a smart city may determine the fire rescue plan based on the monitoring data of the disaster area.

The plurality of scenarios of fire rescue in a smart city may include a traffic road fire rescue scenario, an urban fire rescue scenario, a wild fire rescue scenario, etc. It should be noted that the above scenarios are only some examples, and do not restrict the specific application scenario of the system 200 for determining a fire rescue plan in a smart city. Those skilled in the art may apply the system 200 for determining a fire rescue plan in a smart city to any other suitable scenario based on the descriptions disclosed in the present disclosure.

In some embodiments, the system 200 for determining a fire rescue plan in a smart city may be applied to the traffic road fire rescue scenario. When the system 200 is applied to the traffic road fire rescue scenario, the object platform may obtain traffic flow/human flow information on a road, and the management platform may determine a traffic management measure based on the above information.

In some embodiments, the system 200 for determining a fire rescue plan in a smart city may be applied to the urban fire rescue scenario. When the system 200 is applied to the urban fire rescue scenario, the object platform may obtain building information related to a city, and the management platform may predict fire information in a future period of time based on the building information.

In some embodiments, the system 200 for determining a fire rescue plan in a smart city may be applied to the wild fire rescue scenario. When the system 200 is applied to the wild fire rescue scenario, the object platform may obtain information such as climate, vegetation, etc., and the management platform may determine a rescue plan based on the above information.

The following will take an example of applying the system 200 for determining a fire rescue plan in a smart city to the urban fire rescue scenario to explain the system 200 for determining a fire rescue plan in a smart city in detail.

The user platform 210 may be user-driven, including a platform that obtains a user's needs and feeds back information to the user. In some embodiments, the user platform 210 may be configured as a terminal device. For example, a smart device such as a mobile phone, a computer, etc.

In some embodiments, the user platform 210 may be used to send a fire-related information query instruction to the service platform 220, and receive the fire-related information and feedback the information to the user. For example, the user platform 210 may obtain an instruction input by the user through the terminal device, and query the fire-related information. As another example, the user platform 210 may feedback the fire-related information to the user. The fire-related information may include the fire information, the traffic information, and the rescue plan. For more descriptions about the fire information, the traffic information, and the rescue plan, please see FIG. 3 and related descriptions thereof.

The service platform 220 may be a platform that provides an input service and an output service for the user.

In some embodiments, the service platform 220 may be used to perform information and/or data interaction between the management platform 230 and the user platform 210. For example, the service platform 220 may receive and store the fire-related information query instruction sent by the user platform 210, and then send the instruction to the management platform 230, and may further obtain and store the fire-related information from the management platform 230, and then send the information to the user platform 210.

In some embodiments, the service platform 220 may be provided with a general database of the service platform and a plurality of service sub-platforms. The service sub-platforms may be in a one-to-one correspondence with management sub-platforms. The service sub-platforms may be divided according to an urban area. The plurality of service sub-platforms may respectively store and manage data of different types and different receiving objects uploaded from a lower platform. The general database of the service platform may summarize, store, and transmit the data of the plurality of service sub-platforms to an upper platform. For example, the service sub-platform may obtain the fire-related information from the management sub-platform. The each service sub-platform may store and manage on the obtained fire-related information, and upload the information to the general database of the service platform. The general database of the service platform summarizes and stores the data of each service sub-platform and then transmits the data to the user platform 210. At this time, the data uploaded to the general database of the service platform may be fire-related information of an entire city.

The management platform 230 may refer to an IoT platform that coordinates connection and cooperation between various functional platforms, and provides perception management and control management.

In some embodiments, the management platform 230 may be configured to process information and/or data. For example, the management platform 230 may be configured to process the monitoring data of the disaster area, and determine the fire-related information in response to the user's query instruction.

In some embodiments, the management platform 230 may be further configured to perform information and/or data interaction between the service platform 220 and the sensing network platform 240. For example, the management platform 230 may receive, store the fire-related information query instruction sent by the service platform 220, and then send the instruction to the sensing network platform 240. The management platform 230 may obtain, store the monitoring data of the disaster area from the sensing network platform 240, and then send the data to the service platform 220.

In some embodiments, the management platform 230 may be provided with a plurality of management sub-platforms, and the management sub-platforms may be in a one-to-one correspondence with sensing network sub-platforms. Each management sub-platform may respectively store and process the monitoring data of the disaster area uploaded by the corresponding sensing network sub-platform, and the processed fire-related information may be uploaded to the corresponding service sub-platform.

The sensing network platform 240 may refer to a platform for unified management of sensor communication. In some embodiments, the sensing network platform 240 may be configured as a communication network and a gateway. The sensing network platform 140 may use a plurality of groups of gateway servers, or a plurality of groups of intelligent routers, which are not limited here.

In some embodiments, the sensing network platform 240 may include a plurality of sensing network sub-platforms. The sensing network sub-platforms may also be in a one-to-one correspondence with object sub-platforms, which may be configured to perform information and/or data interaction between the management platform and the object platform. For example, the sensing network sub-platform may receive the instruction to obtain the monitoring data from the disaster area sent by the management sub-platform, and issues the instruction to the corresponding object sub-platform. After receiving the instruction, the object sub-platform may upload the monitoring data of the disaster area to the sensing network sub-platform. The sensing network sub-platform may then transmit the received monitoring data of the disaster area to the corresponding management sub-platform.

The object platform 250 may be a functional device for monitoring. In some embodiments, the object platform 250 may be configured as a monitoring device, such as a monitoring apparatus, a drone, a temperature sensor, etc.

In some embodiments, the object platform 250 may include a plurality of object sub-platforms. In some embodiments, the object sub-platforms may be in a one-to-one correspondence with the sensing network sub-platforms. The object sub-platforms may interact with the sensing network sub-platforms for information and/or data. For example, after the object sub-platform receives the instruction issued by the corresponding sensing network sub-platform to obtain the monitoring data of the disaster area, the object sub-platform may upload the monitoring data of the disaster area obtained by the monitoring device to the sensing network sub-platform.

In some embodiments of the present disclosure, the system for determining a fire rescue plan in a smart city may be built by the IoT functional system of five platforms. The management platform may adopt a combination of the general database and the plurality of sub-platforms. The service platform, the sensing network platform and the object platform may adopt a method of a plurality of sub-platforms arrangement. In this way, antagonism among different types of data may be ensured, so as to ensure classified transmission, trace-ability of data, and classified issuance and processing of instructions, thereby making the structure and data processing of the IoT clear and controllable, and facilitating the control and data processing of the IoT.

Figure 3:
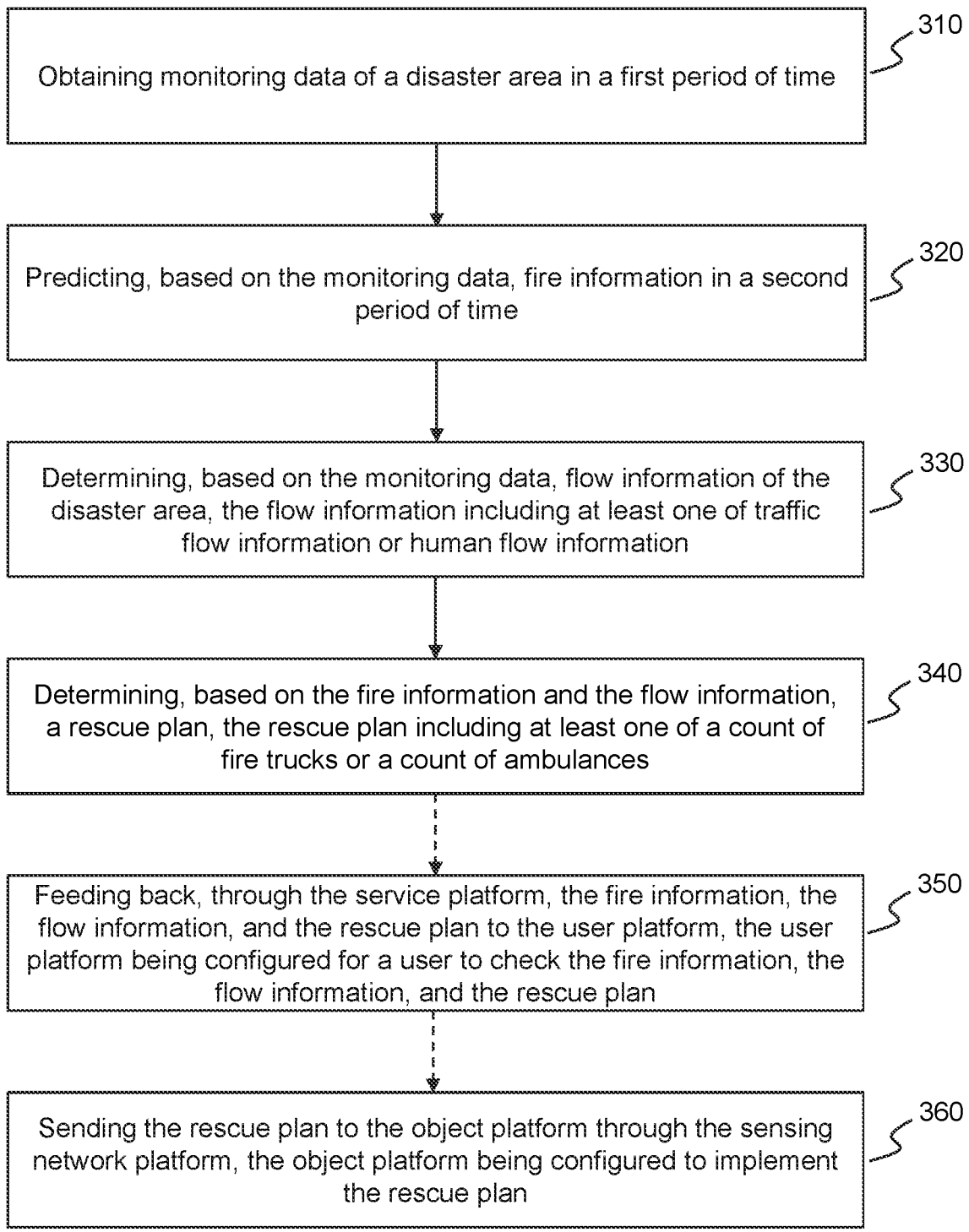
FIG. 3 is a flowchart illustrating an exemplary process for determining a fire rescue plan in a smart city according to some embodiments of the present disclosure.

FIG. 3 is a flowchart illustrating an exemplary process for determining a fire rescue plan in a smart city according to some embodiments of the present disclosure. In some embodiments, the process 300 may be performed by a management platform. The process 300 may include the following operations.

In 310, obtaining monitoring data of a disaster area in a first period of time.

The disaster area may refer to a related geographical area in a city where a fire occurs. The disaster area may include a construction area where the fire occurs, a street surrounding the fire, etc.

The first period of time may refer to a period of time (also referred to as time period, or period) from the occurrence of fire to a first time when a monitoring device obtains monitoring data. For example, if the fire occurs at 14:00, and the monitoring device first collects the monitoring data at 14:05, then the time between 14:00 and 14:05 may be considered as the first period of time.

The monitoring data may refer to relevant data of the disaster area collected by the monitoring device, for example, data such as a fire field image, a temperature, a humidity of the disaster area, etc.

The monitoring data may be obtained in various ways. For example, the information may be shot and uploaded by a drone, the information may be collected using the monitoring device, and the information may be obtained based on a third-party platform, etc., which is not limited here. The third-party platform may be a management platform, an IoT platform, etc. in a smart city.

In 320, predicting, based on the monitoring data, the fire information in a second period of time.

The second time period may refer to a period of time from the first collection of monitoring data by the monitoring device to an expected arrival of a fire truck. For example, if the monitoring device first obtains the monitoring data at 10:10, and the fire truck is expected to arrive at 10:20, the time between 10:10 and 10:20 may be considered as the second time period. The second time period may be later than a first time period.

The fire information may be information related to the fire in the disaster area. For example, a current fire duration, a fire coverage, etc.

The fire information in the second period of time may be predicted in various ways. For example, the prediction may be performed by manually observing changes of the fire in each period of time, or performed using a machine learning model. In some embodiments, based on the monitoring data, the fire prediction model may be used to predict the fire information in the second period of time. For more descriptions on the fire prediction model, please see FIG. 3 and related descriptions thereof.

In 330, determining, based on the monitoring data, flow information of the disaster area, the flow information including at least one of traffic flow information or human flow information.

The flow information may refer to a count of people and/or vehicles passing by a specific area within a certain period of time. The flow information may be expressed in various forms. For example, the flow information may be expressed by a flow density (that is, a count of people/vehicles in a unit length of a road section), a flow value (that is, a count of people/vehicles through a road section within a unit time), etc.

In some embodiments, the flow information in the disaster area may be determined in a variety of ways. For example, the management platform may determine the flow information in the disaster area based on the third-party platform. For example, the management platform may determine the traffic flow information and the human flow information through a traffic monitoring device.

In some embodiments, the management platform may perform an image analysis based on the fire scene image of the disaster area within a period of time, and obtain change data of the count of people and/or vehicles in the disaster area within a period of time, thereby determining the flow information of the disaster area. For more descriptions on the fire scene image, please refer to FIG. 4 and related descriptions thereof.

In some embodiments, based on the monitoring data, a flow prediction model may be used to determine the flow information in the disaster area. For more descriptions on the flow prediction model, please see FIG. 5 and related descriptions thereof.

In 340, determining, based on the fire information and the flow information, a rescue plan, the rescue plan including at least one of a count of fire trucks or a count of ambulances.

The rescue plan may refer to a corresponding rescue measure after the fire occurs. The rescue plan may include rescue of fire scene and rescue of the injured. For example, the rescue plan may include determining the count of fire trucks, the count of ambulances, a type of fire-fighting, a rescue approach, or the like.

In some embodiments, the rescue plan may be determined in a plurality of ways. For example, based on the fire information and the flow information, the rescue plan may be determined manually based on historical rescue experience.

In some embodiments, based on the fire information and the flow information, the management platform may determine the rescue plan through an application. For example, the management platform may set a program for the count of ambulances and the count of fire trucks. When the fire information and the flow information of the disaster area meet different conditions, the count of ambulances and/or the count of fire trucks in the rescue solution may be different. Specifically, if no one is trapped in the disaster area and a fire coverage area is smaller than 100 m$^2$, and a height of a flame is less than or equal to 3 m, the management platform may determine that the count of ambulances in the rescue plan is 0, and the count of fire trucks is 1.

In some embodiments, based on the fire information and the flow information, the management platform may determine the rescue plan through a vector retrieval. For more descriptions on the rescue plan, please refer to FIG. 6 and related descriptions thereof.

In some embodiments, the process 300 may further include the operation 350 of feeding back, through the service platform, the fire information, the flow information, and the rescue plan to the user platform. The user platform is used for a user to check the fire information the flow information, and the rescue plan.

In some embodiments, the service platform may summarize the fire information, the flow information, and the rescue plan and feedback the information to the user platform. For example, a general database of the service platform may summarize and store the fire information, the flow information, and the rescue plan of different areas of a city obtained by the service platform, and then upload the information to the user platform for the user to check. For more descriptions on the service platform and the user platform, please refer to FIG. 2 and related descriptions thereof.

In some embodiments, the process 300 may further include the operation 360 of sending the rescue plan to the object platform through the sensing network platform. The object platform is used to perform the rescue plan.

In some embodiments, after the object platform obtains the rescue plan, the rescue plan may be performed in various approaches. For example, the object platform may send the corresponding rescue plan to different units/departments.

In some embodiments, the object platform may send the rescue plan to a fire department. For example, the object platform may send information such as the count of fire trucks and a count of firefighters required in the rescue plan to the fire department. The fire department may implement rescue according to an actual situation (for example, an actual count of fire trucks available at a nearest fire station may be insufficient, and a joint rescue with other stations may need to be performed, etc.)

In some embodiments, the object platform may send the rescue plan to a medical system. For example, the object platform may send information such as the count of ambulances required in the rescue plan to the medical system. Similarly, the medical system may implement rescue according to the actual situation.

In some embodiments, the object platform may send the rescue plan to a third-party platform. For example, after the object platform obtains the rescue plan, the traffic management measure in the rescue plan may be sent to the traffic management department. The traffic management department may implement a corresponding measure after receiving the traffic management measure, so that the fire trucks and the ambulances may quickly reach the disaster area. For more descriptions about the traffic management measure, please see FIG. 6 and related descriptions thereof.

For more descriptions about the sensing network platform and the object platform, please see FIG. 2 and related descriptions thereof.

It should be noted that the description of the above process 300 is merely provided for example and description, and is not intended to limit the scope of the present disclosure. For those skilled in the art, under the guidance of the present disclosure, various amendments and changes can be made to the process 300. However, these amendments and changes are still within the scope of the present disclosure. For example, the operations 350 and 360 in the process 300 may be selectively omitted.

In some embodiments of the present disclosure, by predicting the fire information and determining the flow information based on the monitoring data, and determining the rescue plan based on the fire information and the flow information, and comprehensively considering future fire information, the human flow information, and the traffic flow information of the disaster area, implementability of the rescue plan can be effectively improved, time for determining the fire rescue plan can be reduced, and rescue efficiency can be improved.

Figure 4:
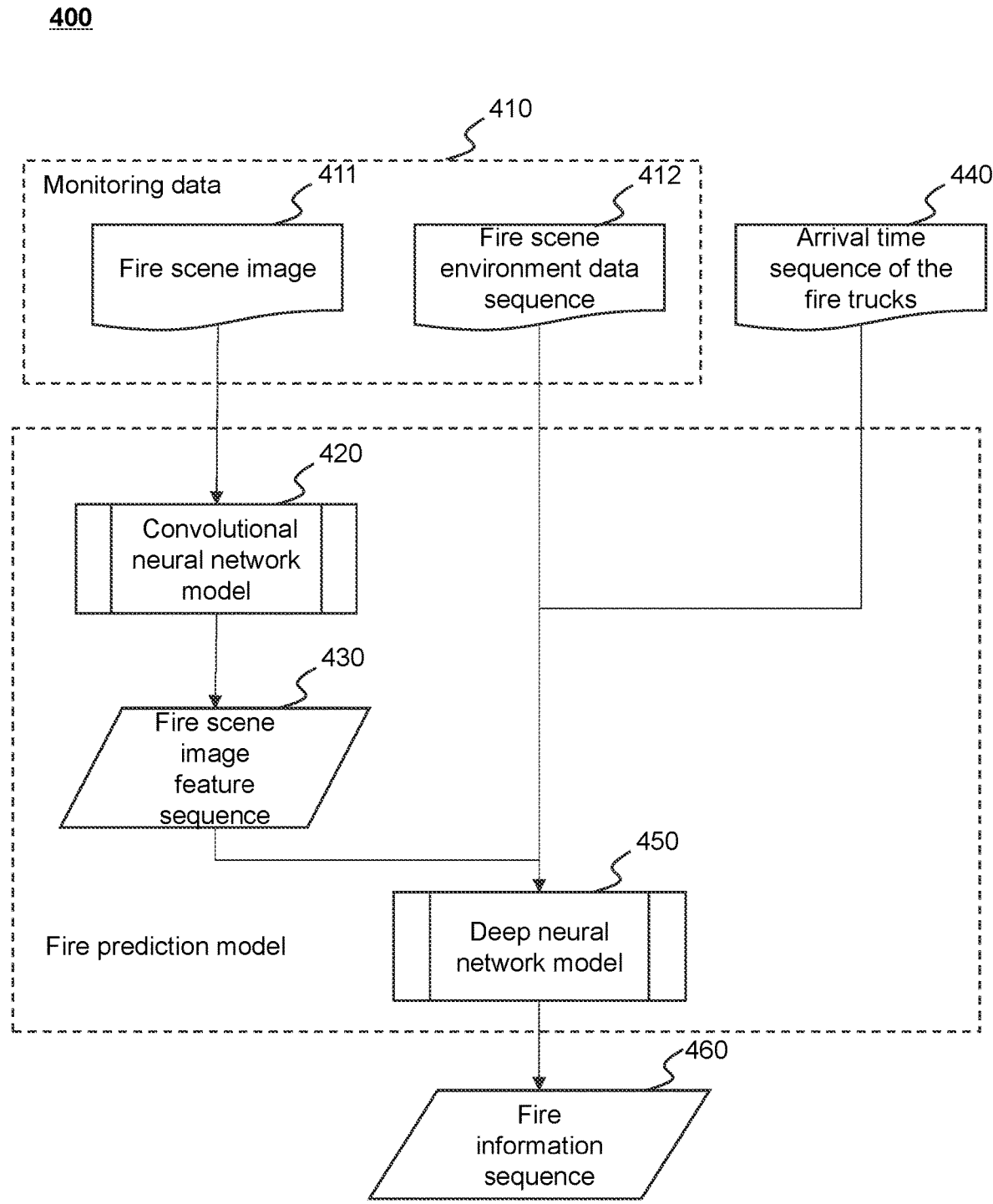
FIG. 4 is a schematic diagram illustrating a fire prediction model of the method for determining a fire rescue plan in a smart city according to some embodiments of the present disclosure.

FIG. 4 is a schematic diagram illustrating a fire prediction model of the method for determining a fire rescue plan in a smart city according to some embodiments of the present disclosure.

In some embodiments, a management platform may process monitoring data based on the fire prediction model and predict fire information.

In some embodiments, the management platform may further predict the fire information through the fire prediction model based on an arrival time of a fire truck and the monitoring data.

In some embodiments, the monitoring data may further include a fire scene image, fire scene environment data, or any combination thereof.

The fire scene image may refer to an image of a fire occurrence place. In some embodiments, the fire scene image may be an image set with a certain time interval. For example, a plurality of images within a period of time.

The fire scene image may be obtained in a plurality of ways. For example, the fire scene image may be obtained through a monitoring device in the disaster area, or may be obtained by drone shooting, etc.

The fire scene environment data may refer to data related to a fire scene environment. For example, the fire scene environment data may include a temperature, a humidity, a wind volume, a wind direction, or any combination thereof. In some embodiments, the fire scene environment data may further include building information. In some embodiments, the fire scene environment data may be data collected with a certain time interval.

The building information may be relevant information of the building where the fire occurs. For example, a building material, a building structure, a stacking object in the building, a building height, and a building distribution location, etc.

In some embodiments, an object platform may use the monitoring device to obtain the fire scene environment data. For example, the fire scene image may be obtained using the monitoring device in the disaster area. Wind volume data may be obtained using a wind volume tester. In some embodiments, the object platform may obtain the fire scene environment data through a third-party platform. For example, the building information related to the fire scene environment may be obtained through an urban IoT platform.

The fire prediction model may be used to predict the fire information in a second period. In some embodiments, the fire prediction model may be a machine learning model, such as a convolutional neural networks (CNN) model, a deep neural networks (DNN) model, or the like, or any combination thereof.

In some embodiments, the fire prediction model may process the monitoring data and predict the fire information. As shown in FIG. 4, the fire prediction model 400 may include a convolutional neural networks model 420 and a deep neural networks model 450.

In some embodiments, the convolutional neural network model 420 may process a plurality of fire scene images 411 to determine a fire scene image feature sequence 430. As shown in FIG. 4, an input of the convolutional neural network model 420 may include the fire scene images 411, and an output may include the fire scene image feature sequence 430. The fire scene image feature sequence 430 may be a plurality of features that reflect features of the fire within a period of time, and the fire scene image feature sequence 430 may be data in the form of a vector.

In some embodiments, the deep neural network model 450 may process the fire scene image feature sequence 430, a fire scene environment data sequence 412, and an arrival time sequence of fire trucks 440, and predict a fire information sequence 460. As shown in FIG. 4, an input of the deep neural network model 450 may include the fire scene image feature sequence 430, the fire scene environment data sequence 412, and the arrival time sequence of fire trucks 440, and an output may include the fire information sequence 460.

In some embodiments, the fire prediction model 400 may be obtained through a joint training of the convolutional neural network model 420 and the deep neural network model 450. An initial convolutional neural network model and an initial deep neural network model may be trained based on a large number of labeled training samples. The training sample may be a historical fire scene image, historical fire scene environment data, and a historical arrival time sequence of fire trucks. The label may be the image feature sequence corresponding to the historical fire scene and the historical fire information sequence. Specifically, the labeled training sample may be input to the initial convolutional neural network model. Parameters of the initial convolutional neural network model and the initial deep neural network model may be updated through training until a trained intermediate convolutional neural network model and a trained intermediate deep neural network model meet a preset condition. The trained convolutional neural network model 420 and the trained deep neural network model 450 may be obtained. The preset condition may be that a loss function is smaller than a threshold, convergence, or a training cycle reaches a threshold.

In some embodiments, the management platform may further verify and optimize the fire prediction model, which may include optimizing the fire prediction model based on known fire information, the corresponding monitoring data and the fire scene environment data.

The verifying and optimizing may refer to verifying a result predicted by the model and optimizing the model.

Specifically, in case the fire occurs at 16:00, and the current time is 16:10, the object platform may perform data monitoring every two minutes and record a total of five times. The corresponding fire prediction model may make five predictions based on the fire monitoring data and the fire scene environment data, and predict fire information corresponding to 16:02, 16:04, 16:06, 16:08 and 16:10, respectively. Now a fire situation of the above five times is known, so the model may be verified and optimized based on the above information. A prediction, verification, and optimization process may be repeated in subsequent predictions to achieve iterative updates of the model.

In some embodiments of the present disclosure, a combination of the convolutional neural network model and the deep neural network model may be used as the fire prediction model, and the fire prediction model may be further optimized by verifying and optimizing the fire prediction model. In this way, efficiency and accuracy of fire information prediction may be improved, which is beneficial to better determine the rescue plan. In addition, the model may be obtained through a joint training, which may improve a model training efficiency and avoid the obtaining of unnecessary labels.

Figure 5:
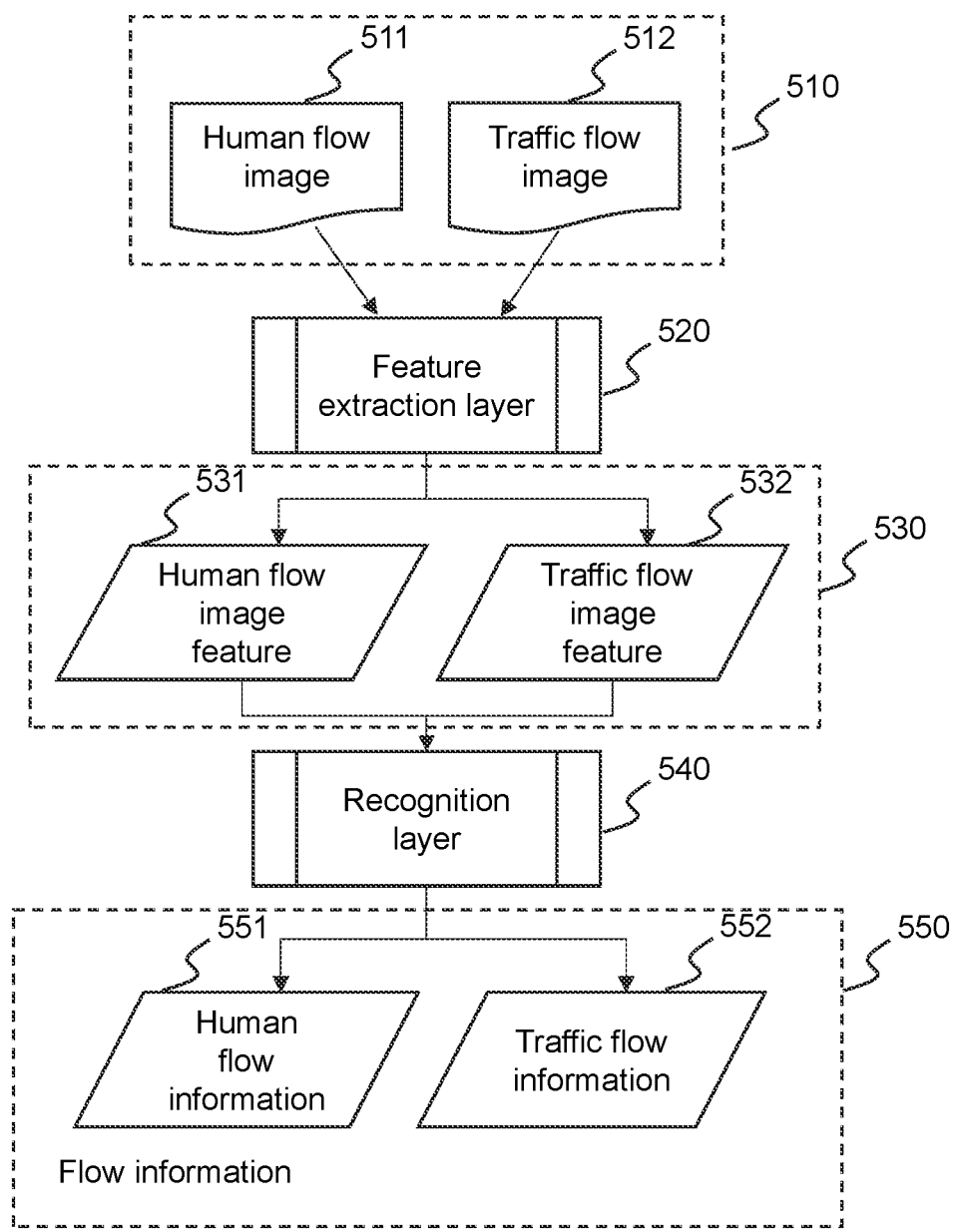
FIG. 5 is a schematic diagram illustrating a flow prediction model of the method for determining a fire rescue plan in a smart city according to some embodiments of the present disclosure.

FIG. 5 is a schematic diagram illustrating a flow prediction model of the method for determining a fire rescue plan in a smart city according to some embodiments of the present disclosure.

In some embodiments, a management platform may process monitoring data based on the flow prediction model to determine flow information of a disaster area.

In some embodiments, the monitoring data may further include a flow image of the disaster area.

The flow image may refer to a real-time image that reflect a human flow and/or a traffic flow. In some embodiments, the flow image may include a human flow image, a traffic flow image, etc.

The flow image may be obtained in various ways. For example, the flow image may be shot and uploaded by a drone in real time, may be obtained using a monitoring device in the disaster area, etc.

The flow prediction model may be used to predict the flow information of the disaster area. In some embodiments, the flow prediction model may be a machine learning model. For example, the flow prediction model may be a convolutional neural network, a deep neural network, or the like, or any combination thereof.

In some embodiments, the flow prediction model may process the human flow image and the traffic flow image to determine human flow information and traffic flow information. As shown in FIG. 5, the flow prediction model 500 may include a feature extraction layer 520 and an identification layer 540. The feature extraction layer 520 may be a model configured to perform feature extraction on a human flow image 511 and a traffic flow image 512. The identification layer 540 may be a model configured to perform feature identification on a human flow image feature 531 and a traffic flow image feature 532.

In some embodiments, the feature extraction layer 520 may process the human flow image 511 and the traffic flow image 512 to determine the human flow image feature 531 and the traffic flow image feature 532. As shown in FIG. 5, an input of the feature extraction layer 520 may include the human flow image 511 and the traffic flow image 512, and an output may include the human flow image feature 531 and the traffic flow image feature 532.

In some embodiments, the identification layer 540 may process the human flow image feature 531 and the traffic flow image feature 532 to determine the human flow information 511 and traffic flow information 512. As shown in FIG. 5, an input of the identification layer 540 may include the human flow image feature 531 and the traffic flow image feature 532, and an output may include the human flow information 551 and the traffic flow information 552.

In some embodiments, the flow prediction model 500 may be obtained through a joint training. The output of the feature extraction layer 520 may be used as the input of the identification layer 540.

For example, sample training data, that is, a sample human flow image and the sample traffic flow image, may be input to an initial feature extraction layer to obtain a human flow image feature and a traffic flow image feature output by the initial feature extraction layer, and the human flow image feature and the traffic flow image feature may be used as an input of an initial flow prediction model to obtain the human flow information and the traffic flow information output by the initial flow prediction model. The output of the initial feature extraction layer may be verified using sample human flow information and sample traffic flow information.

Verification data of an output structure of the initial feature extraction layer may be obtained using a back-propagation feature of the neural network model, and the above training may be continued using the verification data until the trained feature extraction layer and identification layer are obtained, and then the trained flow prediction model may be obtained.

In some embodiments, the sample data of the joint training may include the sample human flow image and the sample traffic flow image. The labels may be the sample human flow image information and the sample traffic flow information. The sample human flow image and the sample traffic flow image may be input to the feature extraction layer to obtain the human flow image feature and the traffic flow image feature output by the feature extraction layer. The human flow image feature and the traffic flow image feature may be input to the identification layer as training sample data to obtain the human flow information and the traffic flow information output by the identification layer. Based on the sample human flow information, the sample traffic flow information, the human flow information and the traffic flow information output by the identification layer, a loss function may be constructed, and parameters of the feature extraction layer and the identification layer may be simultaneously updated. Through parameter updating, the trained feature extraction layer and the trained identification layer may be obtained.

In some embodiments of the present disclosure, through using the trained flow prediction model, data processing efficiency can be improved, and the flow information of the disaster area may be more accurately predicted to better determine the rescue plan. In addition, by jointly training the feature extraction layer and the identification layer in the flow prediction model, training efficiency of the model can be improved and obtaining of unnecessary labels can be avoided.

Figure 6:
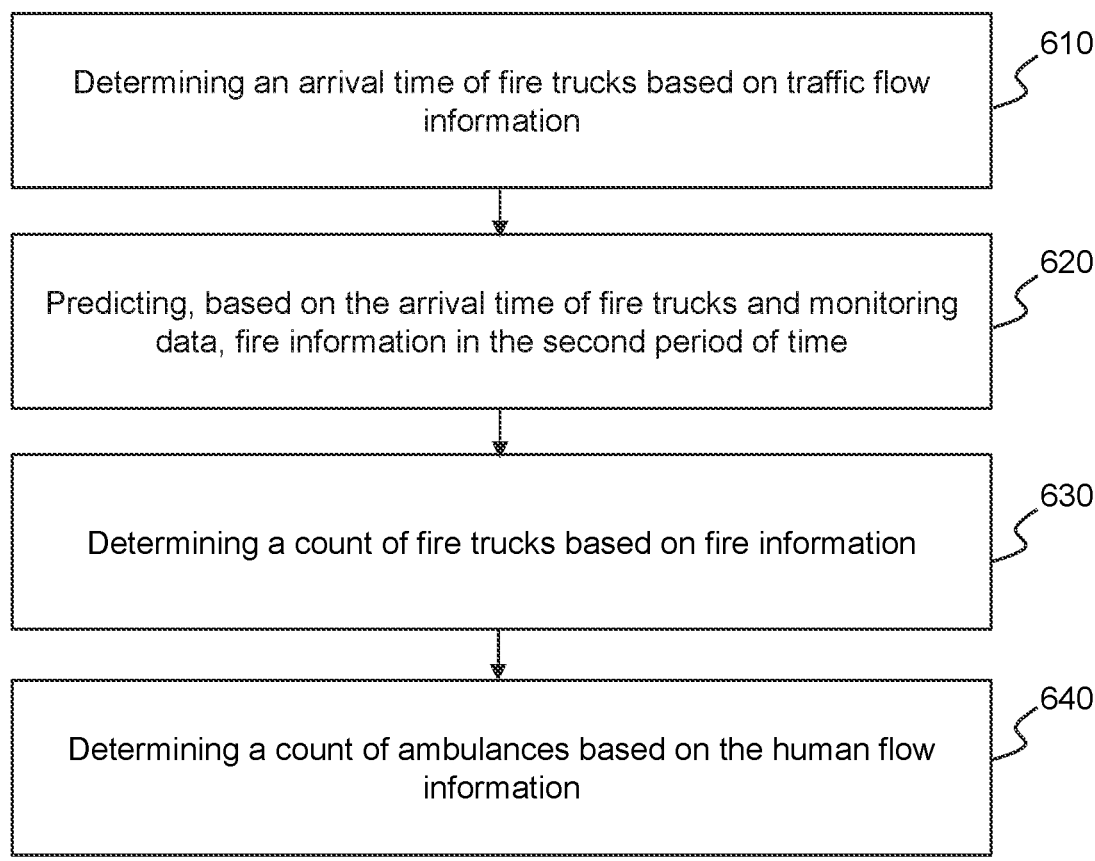
FIG. 6 is a flowchart illustrating an exemplary process for determining a fire rescue plan in a smart city according to some embodiments of the present disclosure.

FIG. 6 is a flowchart illustrating an exemplary process for determining a fire rescue plan in a smart city according to some embodiments of the present disclosure. In some embodiments, the process 600 may be performed by a management platform. The process 600 may include the following operations.

In 610, determining an arrival time of fire trucks based on traffic flow information.

The arrival time of the fire trucks may refer to the time when the fire trucks are expected to reach a fire scene.

In some embodiments, the arrival time of the fire trucks may be determined based on traffic flow information and through various approaches such as a fitting, a mathematical analysis, and a deep learning, etc.

In some embodiments, a management platform may determine a traffic management measure based on the traffic flow information; and determine the expected arrival time of the fire trucks based on the traffic management measure.

The traffic management measure may refer to traffic control or diversion of roads on which the fire trucks and/or ambulances will travel. The traffic management measure may further include a measure such as diversion of vehicles, road restriction, etc.

By formulating and implementing corresponding traffic management measures, a driving speed and distance of the fire trucks and/or the ambulances to the fire scene may be determined. Based on the driving speed and distance, the expected arrival time of the fire trucks and/or the ambulances may be determined.

In 620, predicting, based on the arrival time of fire trucks and monitoring data, fire information in the second period of time.

The fire information in the second period of time may be predicted in various ways. In some embodiments, the fire information in the second period of time may be predicted using a fire prediction model based on the arrival time of the fire trucks and the monitoring data, fire scene environment data. For more descriptions about how to predict the fire information in the second period and the fire prediction model, please see FIGS. 3-4, and the related descriptions thereof.

In 630, determining a count of fire trucks based on the fire information.

In some embodiments, the count of fire trucks may be determined through various approaches such as a fitting, a mathematical analysis, and a deep learning, etc. based on the fire information.

In some embodiments, the management platform may determine a fire information feature vector based on the fire information; obtain historical fire information and a historical rescue plan corresponding to the historical fire information, wherein the historical rescue plan includes a count of historical fire trucks; determine a plurality of historical fire information feature vectors based on the historical fire information; and determine a reference vector from the plurality of historical fire information feature vectors based on the fire information feature vectors, and determine the count of historical fire trucks in the historical rescue plan corresponding to the reference vector as a count of fire trucks currently required.

The fire information feature vector may be a vector that reflects features of the fire information. The fire information feature may include a feature such as a current duration of the fire and a scope of fire coverage, etc. For example, the fire information feature vector (30,500) may indicate that the current duration of the fire is 30 minutes, and the scope of fire coverage is 500 meters.

In some embodiments, the management platform may determine the fire information feature vector by processing the fire information through a machine learning model. The machine learning model may be a neural network model or other models such as a decision tree, etc.

In some embodiments, the management platform may obtain the historical fire information and a historical rescue plan corresponding to the historical fire information in various ways. For example, the historical fire information and the historical rescue plan corresponding to the historical fire information may be retrieved directly from a storage device and a database of the management platform, or may be obtained indirectly by querying other storage devices, etc. The historical fire information may refer to relevant fire information when the fire occurs in history. The historical rescue plan may refer to rescue measures taken during a fire in history.

Similarly, in some embodiments, the management platform may process the historical fire information using the machine learning model to determine the plurality of historical fire information feature vectors. The historical fire information feature vector may refer to a vector that reflects a corresponding feature of the historical fire information.

In some embodiments, the plurality of historical fire information feature vectors may be stored in a feature database. The feature database may be a database that stores one or more fire information features. A form of the data stored in the feature database may not be limited. The data may be stored in the form of the vector, or other form such as an image, text, etc.

In some embodiments, the historical rescue plan corresponding to the historical fire information may be related to the historical fire information feature vector, and the historical rescue plan may be stored in the feature database. In some embodiments, the feature database may store each fire information feature and the rescue plan corresponding to the fire information during an application process, so as to continuously expand the database.

In some embodiments, the management platform may retrieve and obtain a first reference feature vector based on the feature database based on the fire information feature vector. The first reference feature vector may be a vector with a highest degree of correlation and a highest similarity with the fire information feature vector among the historical fire information feature vectors. For example, the management platform may retrieve in the feature database based on the fire information feature vector, and determine the feature vector that meets a first preset condition as the first reference feature vector. The first preset condition may be that a vector similarity is not lower than a preset similarity threshold. The vector similarity may be determined based on a Euclidean distance, a cosine distance, a Mahalanobis distance, a Chebyshev distance, and/or a Manhattan distance between the vectors, and the smaller the distance, the higher the vector similarity. In some embodiments, the management platform may retrieve one or more first reference feature vectors from the feature database based on the fire information feature vectors.

In some embodiments, the management platform may determine, based on the first reference feature vectors, that the count of historical fire trucks in the historical rescue plan related with the first reference feature vector is the count of fire trucks currently required. In some embodiments, when the first reference feature vector is not retrieved, the management platform may continue to perform the retrieval operation until the first reference feature vector is retrieved. In some embodiments, when only one first reference feature vector is retrieved, the management platform may directly take the historical count of fire trucks in the historical rescue plan corresponding to the first reference feature vector as the count of fire trucks currently required. In some embodiments, when a plurality of first reference feature vectors are retrieved, the management platform may take the count of historical fire trucks in the historical rescue plan corresponding to the first reference feature vector with a smallest vector distance as the count of fire trucks currently required.

In 640, determining a count of ambulances based on the human flow information.

The count of ambulances may be determined in various ways. For example, the count of ambulances may be determined according to a count of trapped people, or according to the human flow information determined by a human flow prediction model. In some embodiments, the management platform may further determine the count of ambulances required currently using an approach of vector retrieval.

In some embodiments, the management platform may process the human flow information and the historic human flow information through a machine learning model, and obtain a human flow information feature vector and a historic human flow information feature vector.

In some embodiments, the historical human flow information feature vector may be related to the historical rescue plan corresponding to the historical human flow information, and may be stored in the feature database. There may be a plurality of approaches to obtain the historical human flow information and the historical rescue plan corresponding to the historical human flow information, such as retrieving directly from a general database of the management platform. The historical rescue plan may include a count of historical ambulances.

In some embodiments, the management platform may retrieve and obtain a second reference feature vector from the feature database based on the human flow information feature vector. The second reference feature vector may be a vector with a highest correlation and a highest similarity with the human flow information feature vector in the historical human flow information feature vectors. For example, the management platform may retrieve in the feature database based on the human flow information feature vector, and determine the feature vector that satisfies a second preset condition as the second reference feature vector. For more descriptions on the second preset condition, please refer to the relevant description of the first preset condition.

In some embodiments, the management platform may determine the count of historical ambulances in the historical rescue plan related to the second reference feature vector based on the second reference feature vector as the count of ambulances current required. In some embodiments, when the second reference feature vector is not retrieved, the management platform may continue to perform the retrieval operation until the second reference feature vector is retrieved. In some embodiments, when only one second reference feature vector is retrieved, the management platform may directly take the historical count of ambulances in the historical rescue plan corresponding to the second reference feature vector as the count of ambulances currently required. In some embodiments, when a plurality of second reference feature vectors are retrieved, the management platform may take the count of historical ambulances in the historical rescue plan corresponding to the second reference feature vector with a smallest vector distance as the count of ambulances currently required.

In some embodiments of the present disclosure, determining the count of fire trucks and the count of ambulances through an approach of vector retrieval can improve decision-making efficiency of the rescue plan.

Some embodiments of the present disclosure provide a computer-readable storage medium storing computer instructions. When reading the computer instructions in the storage medium, a computer may implement the aforementioned method.

The present disclosure provides a method and an IoT system for determining a fire rescue plan in a smart city. By constructing the IoT system based on a five-platform structure, and adopting combination of the general database and the sub-platforms, antagonism between different types of data may be ensured, which may be convenient to classify and process the data. By using the trained fire prediction model and flow prediction model to predict the fire information and the flow information of the disaster area, and using the approach of vector retrieval to determine the count of fire trucks and the count of ambulances, not only the decision-making efficiency of the rescue plan can be effectively improved, but also the rationality of the rescue plan can be ensured, so that the urban fire rescue work can be implemented faster and better.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various parts of present disclosure are not necessarily all referring to the same embodiment. Further, certain features, structures, or features of one or more embodiments of the present disclosure may be combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for determining a fire rescue plan in a smart city applied to an Internet of Things (IoT) system for determining a fire rescue plan in a smart city, wherein the IoT system includes a user platform, a service platform, a management platform, a sensing network platform, and an object platform, comprising:

obtaining monitoring data of a disaster area in a first period of time, wherein the monitoring data includes at least one of a fire scene image or fire scene environment data, and the fire scene environment data includes at least one of a temperature, a humidity, a wind volume, or a wind direction;

predicting, based on the monitoring data and an arrival time of fire trucks, fire information in a second period of time via a fire prediction model, wherein the fire prediction model is a machine learning model;

the fire prediction model includes a convolutional neural network model and a deep neural network model;

an input of the convolutional neural network model includes the fire scene image, and an output of the convolutional neural network model includes a fire scene image feature sequence;

an input of the deep neural network model includes the fire scene image feature sequence, a fire scene environment data sequence, and an arrival time sequence of the fire trucks, and an output of the deep neural network model includes a fire information sequence;

the fire prediction model is obtained through a joint training of the convolutional neural network model and the deep neural network model; and the fire prediction mode is optimized based on known fire information, corresponding monitoring data, and the fire scene environment data;

determining, based on the monitoring data, flow information of the disaster area, via a flow prediction model, wherein the flow information includes at least one of traffic flow information or human flow information;

the flow prediction model is a machine learning model;

the monitoring data includes a flow image of the disaster area;

the flow image includes at least one of a traffic flow image or a human flow image;

the flow prediction model includes a feature extraction layer and an identification layer; an input of the feature extraction layer includes the human flow image and the traffic flow image, and an output of the feature extraction layer includes a human flow image feature and a traffic flow image feature; an input of the identification layer includes the human flow image feature and the traffic flow image feature, and an output of the identification layer includes the human flow information and the traffic flow information;

the flow prediction model is obtained through a joint training of the feature extraction layer and the identification layer; the output of the feature extraction layer is used as the input of the identification layer;

wherein the joint training of the feature extraction layer and the identification layer includes:
inputting a sample human flow image and a sample traffic flow image into an initial feature extraction layer to obtain the human flow image feature and the traffic flow image feature output by the initial feature extraction layer, using the human flow image feature and the traffic flow image feature as an input of an initial flow prediction model to obtain the human flow information and the traffic flow information output by the initial flow prediction model; verifying the output of the initial feature extraction layer based on sample human flow information and sample traffic flow information to obtain verification data of an output structure of the initial feature extraction layer, and obtaining the flow prediction model by continuing training using the verification data until a trained feature extraction layer and a trained identification layer are obtained;
determining, based on the fire information and the flow information, a rescue plan, the rescue plan including at least one of a count of fire trucks or a count of ambulances;
feeding back, through the service platform, the fire information, the flow information, and the rescue plan to the user platform, wherein the user platform is configured for a user to check the fire information, the flow information, and the rescue plan; and
sending the rescue plan to the object platform through the sensing network platform, wherein the object platform is configured to implement the rescue plan; and the rescue plan includes:
sending the count of fire trucks and a count of firefighters required in the rescue plan to a fire department to implement rescue; and sending a count of ambulances required in the rescue plan to a medical system to implement the rescue.

2. The method of claim 1, wherein the determining, based on the fire information and the flow information, a rescue plan comprises:
determining, based on the traffic flow information, the arrival time of the fire trucks;
predicting, based on the arrival time of the fire trucks and the monitoring data, the fire information in the second period of time;
determining, based on the fire information, the count of fire trucks; and
determining, based on the human flow information, the count of ambulances.

3. The method of claim 2, wherein the determining, based on traffic flow information, the arrival time of the fire trucks comprises:
determining, based on the traffic flow information, a traffic management measure; and
determining, based on the traffic management measure, the arrival time of the fire trucks.

4. The method of claim 2, wherein the determining, based on the fire information, the count of fire trucks comprises:
determining, based on the fire information, a fire information feature vector;
obtaining historical fire information and a historical rescue plan corresponding to the historical fire information, wherein the historical rescue plan includes a count of historical fire trucks;
determining, based on the historical fire information, a plurality of historical fire information feature vectors, wherein the plurality of historical fire information feature vectors are stored in a feature database;
retrieving, based on the plurality of fire information feature vectors, a first reference feature vector from the feature database, including:
retrieving in the feature database based on the fire information feature vector, and
determining a feature vector that meets a first preset condition as the first reference feature vector, wherein the first preset condition is that a vector similarity is not lower than a preset similarity threshold;
and
designating a count of historical fire trucks in the historical rescue plan corresponding to the first reference feature vector as the count of fire trucks.

5. The method of claim 4, the method further comprising:
when the first reference feature vector is not retrieved, continuing to perform the retrieval operation until the first reference feature vector is retrieved;
when only one first reference feature vector is retrieved, taking a historical count of fire trucks in the historical rescue plan corresponding to the first reference feature vector as the count of fire trucks;
when a plurality of first reference feature vectors are retrieved, taking the historical count of fire trucks in the historical rescue plan corresponding to the first reference feature vector with a smallest vector distance as the count of fire trucks.

6. An Internet of Things (IoT) system for determining a fire rescue plan in a smart city, wherein the system includes a user platform, a service platform, a management platform, a sensing network platform, and an object platforms, and the management platform is configured to:
obtain, through the sensing network platform, monitoring data of a disaster area in a first period of time, wherein the monitoring data includes at least one of a fire scene image or fire scene environment data, and the fire scene environment data includes at least one of a temperature, a humidity, a wind volume, or a wind direction;
predict, based on the monitoring data and an arrival time of fire trucks, fire information in a second period of time via a fire prediction model, wherein
the fire prediction model is a machine learning model;
the fire prediction model includes a convolutional neural network model and a deep neural network model;
an input of the convolutional neural network model includes the fire scene image, and an output of the convolutional neural network model includes a fire scene image feature sequence;
an input of the deep neural network model includes the fire scene image feature sequence, a fire scene environment data sequence, and an arrival time sequence of the fire trucks, and an output of the deep neural network model includes a fire information sequence;
the fire prediction model is obtained through a joint training process of the convolutional neural network model and the deep neural network model; and
the fire prediction mode is optimized the fire prediction model based on known fire information, corresponding monitoring data, and the fire scene environment data;
determine, based on the monitoring data, flow information of the disaster area via a flow prediction model, wherein
the flow information includes at least one of traffic flow information or human flow information;
the flow prediction model is a machine learning model;
the monitoring data includes a flow image of the disaster area;

the flow image includes at least one of a traffic flow image or a human flow image;

the flow prediction model includes a feature extraction layer and an identification layer; an input of the feature extraction layer includes the human flow image and the traffic flow image, and an output of the feature extraction layer includes a human flow image feature and a traffic flow image feature:

an input of the identification layer includes the human flow image feature and the traffic flow image feature, and an output of the identification layer includes the human flow information and the traffic flow information;

the flow prediction model is obtained through a joint training of the feature extraction layer and the identification layer; the output of the feature extraction layer is used as the input of the identification layer;

wherein the joint training of the feature extraction layer and the identification layer includes:

inputting a sample human flow image and a sample traffic flow image into an initial feature extraction layer to obtain the human flow image feature and the traffic flow image feature output by the initial feature extraction layer, using the human flow image feature and the traffic flow image feature as an input of an initial flow prediction model to obtain the human flow information and the traffic flow information output by the initial flow prediction model; verifying the output of the initial feature extraction layer based on sample human flow information and sample traffic flow information to obtain verification data of an output structure of the initial feature extraction layer, and obtaining the flow prediction model by continuing training using the verification data until a trained feature extraction layer and a trained identification layer are obtained;

determine, based on the fire information and the flow information, a rescue plan, the rescue plan including at least one of a count of fire trucks or a count of ambulances;

feed back, through the service platform, the fire information, the flow information, and the rescue plan to the user platform, wherein the user platform is configured for a user to check the fire information, the flow information, and the rescue plan; and send the rescue plan to the object platform through the sensing network platform;

implement the rescue plan via the object platform, wherein to implement the rescue plan, the object platform is further configured to:

send the count of fire trucks and a count of firefighters required in the rescue plan to a fire department to implement rescue; and send a count of ambulances required in the rescue plan to a medical system to implement the rescue.

7. The IoT system of claim 6, wherein the management platform is further configured to:

determine, based on the traffic flow information, the arrival time of the fire trucks;

predict, based on the arrival time of the fire trucks and the monitoring data, the fire information in the second period of time;

determine, based on the fire information, the count of fire trucks; and determine, based on the human flow information, the count of ambulances.

8. The IoT system of claim 7, wherein the management platform is further configured to:

determine, based on the traffic flow information, a traffic management measure; and determine, based on the traffic management measure, the arrival time of the fire trucks.

9. A non-transitory computer-readable storage medium storing computer instructions, wherein when reading the computer instructions in the storage medium, a computer implements the method of claim 1.

* * * * *